Dec. 12, 1933. W. D. ARCHEA 1,938,770
MILLING MACHINE
Filed Sept. 28, 1929 2 Sheets-Sheet 1

Inventor
WALTER D. ARCHEA
H. R. Parsons
Attorney

Dec. 12, 1933.    W. D. ARCHEA    1,938,770
MILLING MACHINE
Filed Sept. 28, 1929    2 Sheets-Sheet 2
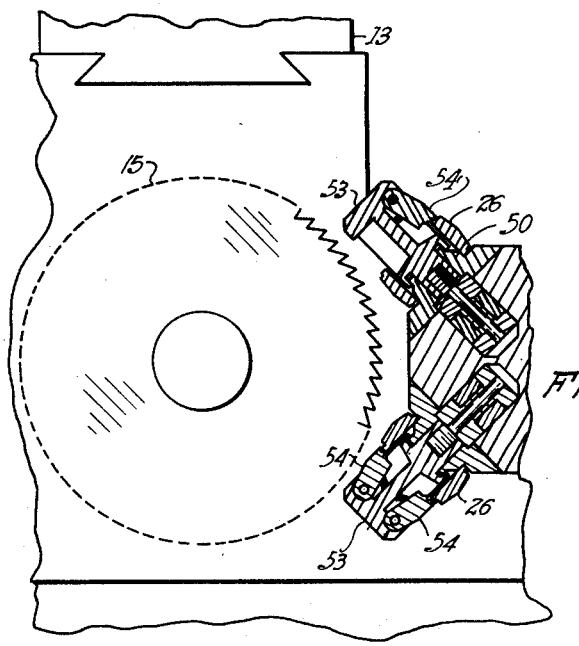
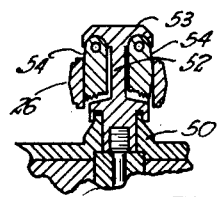
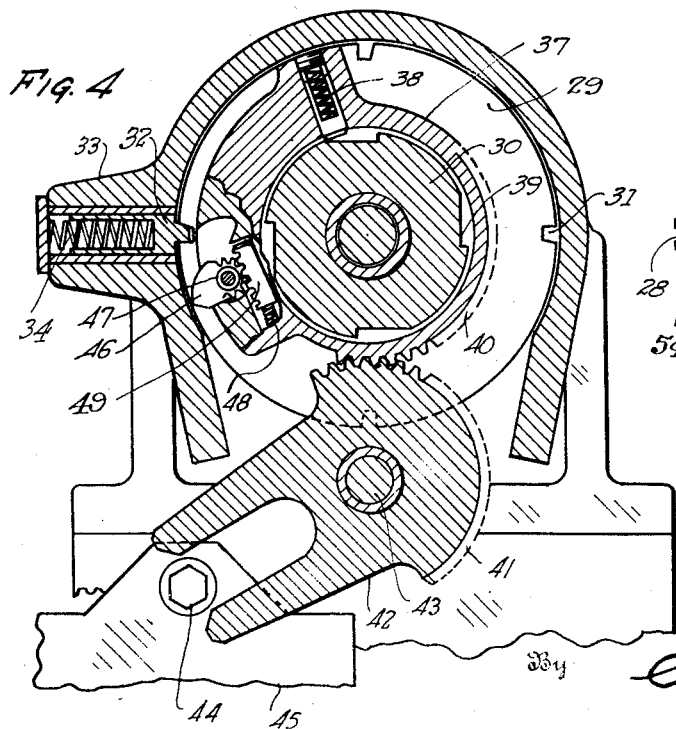
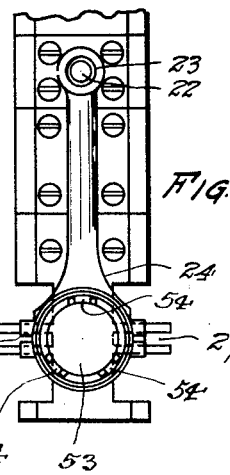
Inventor
WALTER D. ARCHEA
By A. K. Parsons
Attorney Patented Dec. 12, 1933

1,938,770

UNITED STATES PATENT OFFICE 1,938,770

MILLING MACHINE

Walter D. Archea, Norwood, Ohio, assignor to The Cincinnati Milling Machine Company, Cincinnati, Ohio, a corporation of Ohio Application September 28, 1929
Serial No. 395,945

13 Claims. (Cl. 90—56)

This invention relates to improvements in milling machinery and has particular reference to a machine for splitting connecting rods or other articles.

One of the objects of the present invention is the provision of an improved mechanism for successive presentation of a series of work pieces in operative relation to a cutter in such manner as to facilitate the removal and replacement of work pieces in a series while the cutting operation is being performed on other work pieces.

A further object of the invention is the provision of improved simplified means for imparting an intermittent indexing movement to the work carrier controlling the presentation of the work pieces.

An additional object is the provision of an improved work clamp mechanism which will obviate the use of loose or extraneous parts, will facilitate initial mounting of a work piece in the machine, insure firm retention of the piece during the cutting operation and subsequent retention of the several parts produced by said cutting and at the same time permit of rapid withdrawal of the severed parts when the same have been advanced to the loading station.

Other objects and advantages of the present invention should be readily apparent by reference to the following specification considered in conjunction with the accompanying drawings and it will be understood that any modifications may be made in the specific structural details hereinafter described or combination and arrangement of parts within the scope of the appended claims without departing from or exceeding the spirit of the invention.

Figure 3 is a section as on the line 3—3 of Figure 2 illustrating the operative relation of the work and cutter.

Figure 4 is a section as on line 4—4 of Figure 2 illustrating the index controlling mechanism.

Figure 5 is a fragmentary sectional view illustrating the position occupied by the clamp members during loading operation, and Figure 6 is a plan view of the work with the clamp members in section illustrating the retention of the individual parts thereby.

Figure 1:
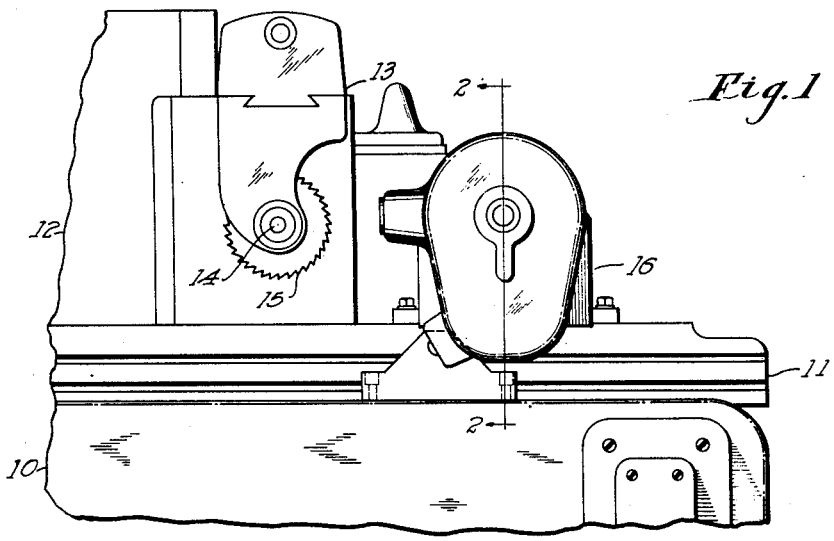
Figure 1 is a fragmentary front view of a machine equipped with present improvements.

In the drawings the numeral 10 designates the bed of a milling machine having mounted thereon a table member 11 suitably reciprocated in any conventional manner. The machine is further provided with a column 12 adjustably supporting the spindle carrier 13 for spindle 14 having mounted thereon and driven thereby a slotting cutter 15.

Secured on the table is a housing 16 having bearings as at 17 and 18 for the trunnions 19 and 20 on the work carrier or drum 21. This drum is exteriorly provided with a plurality of lugs or centering pins 22 for engagement in the pin receiving aperture 23 of the work piece which is illustrated as a connecting rod 24. This rod is initially formed at its opposite end with a cylindrical enlargement adapted to provide the crank pin bearing portion which in the final rod is split to provide a portion 25 integral with the rod and a separate cap member 26. The present machine is particularly adapted for the performance of this splitting operation the cutter producing the kerfs 27 and 28 in the unitary rod to sever the cap 26 therefrom. In operation, the adjacent faces of a pair of rods are simultaneously engaged by the cutter 15 and the desired cuts produced therein after which the drum is indexed to present the opposite side of the piece first operated on together with the adjacent side of a new work piece as should be readily understood by reference to Figure 3.

To effect the desired indexing of the work pieces the trunnion 20 has secured to the outer end thereof a disc 29 having a centrally located ratchet portion 30 and having in its periphery a series of notches 31 for engagement by the locking pawl 32 carried by the portion 33 on the housing and urged against the periphery of the disc as by a spring 34. Journaled in the cap plate 35 is hub 36 of the oscillatable pawl carrier 37 bearing a spring pressed pawl 38 for cooperative engagement with the teeth or notches 39 of ratchet 30. This carrier is further provided with a circular rack 40 meshing with the segmental rack head 41 of the bifurcated actuating lever 42 pivoted as at 43 to the housing. The furcations of the lever project in spanning relation to roller 44 carried by bracket 45 on the bed 10 of the machine. As the table is reciprocated interengagement of the furcations with the roller will cause a timed oscillation of the lever and a consequent corresponding movement of the pawl carrier. As the table moves inward a right hand or clockwise oscillation will be imparted to the carrier 37. Its initial movement will bring cam dog 46 into engagement with the inner end of locking pawl 32 pressing the same outward in disengaging relation to notch 31 and releasing disc 29 and thus the drum. Continued movement will cause operative engagement of pawl 38 with the adjacent ratchet 30 and as the table moves inward the drum will be indexed 90° to properly present a pair of work pieces to the cutter as illustrated in Figure 3. Member 32 having been released by passage therebeyond of the dog 46, will automatically engage in the next succeeding recess to lock the drum and parts in indexed position for the cutting. At the completion of the cutting the table is reversed in a well known manner and the engagement of roller 44 and lever 42 will cause a reverse or idle oscillation of the pawl carrier 37, during this movement dog 46 which is pivotally mounted as at 47 will ride idly by the locking member 32 compressing actuating spring 48 of rack plunger 49 which will return the dog to the operative position shown in Figure 4 when it is snapped by member 32.

Figure 2:
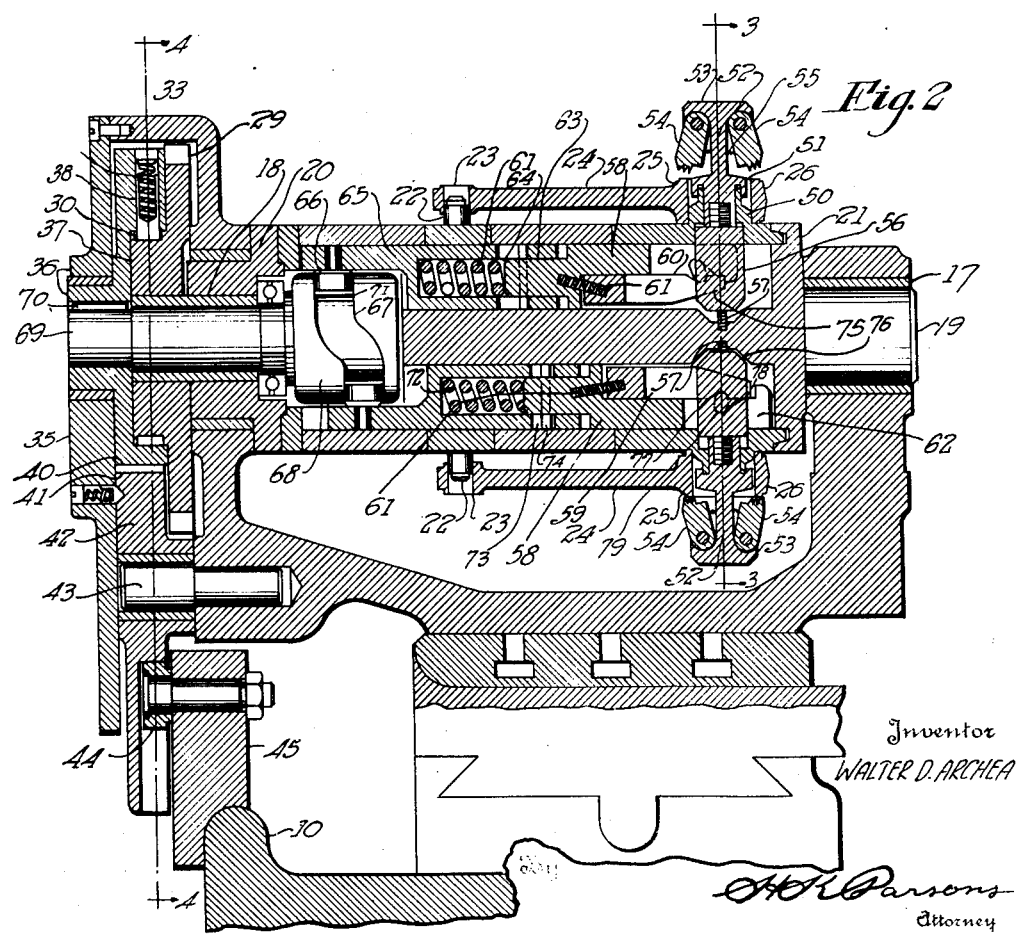
Figure 2 is a section through the work holding and indexing mechanism taken as on the line 2—2 or Figure 1.

To properly retain the work pieces in operative position both when they are in their unitary condition and also when cap has been severed use is made of the mechanism particularly illustrated in Figures 2, 5 and 6.

Formed exteriorly on the drum are bosses 50 disposed to just fit the inner bore 51 of the work piece 24. Slidable within these bosses are clamp plungers 52 having heads 53 to which at substantially equally spaced points are pivoted the depending clamp fingers 54 shown as three in number. These fingers are outwardly urged by springs 55 into position to overlie the peripheral rim of the crank pin bearing portion 25 of the work piece as particularly shown in Figure 2. Depending through the bosses are the slotted plunger blocks 56 normally outwardly urged by springs 57 to hold the respective clamp heads into released position. These slots accommodate the slidable clamp actuators comprising the members 58 recessed as at 59 to receive the wedge blocks 60 longitudinally urged with respect thereto by the springs 61. The recesses terminating in shoulder portion 62 limiting the relative movement of the member 60 and serving to force member 60 therewith into retracted position. At their opposite ends the locking slides 58 have tangs 63 feeding within the sockets 64 of actuators 65 which have rollers 66 engaged in track 67 of control cam 68. This cam has a spindle 69 journaled within the trunnion 20 and ratchet disc 29 and is keyed as at 70 to the oscillating pawl carrier 37. In operation the off-set 71 of the cam will be aligned with the upper or completed work piece when the parts are in operative position as the parts are indicated in Figure 3. As the table moves the work holder away from the cutter, member 42 is oscillated in turn imparting a counter-clockwise movement to the pawl carrier and the associate cam while the drum and work clamps are held against said rotative movement. The degree of this movement is such as to shift the offset 71 of the cam from alignment with the uppermost cam into alignment with the upper of the two work stations where a completed work piece is now held.

This movement of the cam moves the associate roller 66 to the left carrying with it slide 65 and relieving compression on spring 72 and in its further movement tends to cause the terminal portion of the plunger adjacent slots 73 to engage with pin 74 of member 58 pulling said member into releasing position.

At the same time that the offset is brought into engagement with the control roller for the completed work clamp the main portion of the cam track engages the roller of the adjacent clamp which has just been loaded with a fresh work piece shifting its slide 65 to the right compressing spring 72 and tending to force member 58 transversely of the slotted plunger base 56. During this transverse movement the inclined face 75 of wedge block 60 rides against the base 76 of the plunger block 56 forcing same inward to pull the plunger clamp in and bring fingers 54 into locking engagement with the work. This movement continues until the clamp pressure is sufficient to cause a sliding of spring 61 when a continued movement will be imparted to member 58 as respects member 60.

These two members are formed with recesses 77 and 78 for reception of the interposed toggle block 79 and upon such relative movement a rolling action will be imparted to the toggle accentuating the clamp pressure and firmly locking the clamp in engagement with the work.

It will be noted (Figure 6) that a single clamp finger 54 is disposed intermediate the work positioning boss 50 and stud 22 such that the body of the connecting rod is firmly secured between the two positioning members therefor. In addition the other two clamp fingers engage the outer or cap portion and are securely pressed downward there-against to firmly independently secure the cap member in position and properly retain same after severance from the remainder of the rod.

In the further operation of the machine as the pawl carrier and drum rotate or move together to index the drum to the next station during movement of the same in the direction of the work the cam track will retain the newly loaded work piece and the two work pieces in advance thereof all in proper clamped position while the completed work piece will be relieved of the clamping pressure there-against, but will have the clamping fingers still resting upon or steadying the completed work piece as the fixture indexes to move this work piece to the upper station remote from the cutter.

The operator may then laterally tilt and withdraw the cap from this pair of retaining fingers and independently tilt and remove the body portion of the connecting rod without in any way disarranging or removing any portion of the clamp or effecting any manual actuation of the clamp members.

The parts having been removed it is merely necessary to grasp the new work piece and press same down over the clamp fingers as indicated in Figure 5 when the jar of the work will itself automatically shift the fingers inward the work being pressed into place on the locating boss and locating stud when the springs 55 will expand the clamp fingers to overlie and retain the work ratchet for subsequent positive securing thereof by the mechanism just described.

From the foregoing description, considered in conjunction with the accompanying drawings, the construction and operation of the present invention should be readily appreciated and it will be seen that primarily there has been provided an improved automatic quick acting work clamping mechanism in which it is merely necessary for the operator to slip a work piece into position on the machine when it will be automatically retained without manual actuation of initial clamping members insertion of locking washers or other retaining devices in which subsequent automatic operation of the machine will serve to firmly clamp and secure the work in position for the cutting or tooling operations to be performed thereon and in which the clamping mechanism is of such nature that when the positive clamping pressure has been automatically released the work pieces may be easily withdrawn from engagement therewith.

It will further be noted that there has been provided an improved simplified form of automatic mechanism for simultaneously effectively controlling the successive joining and releasing of individual clamp members and at the same time properly indexing the work fixture for successive presentation of work pieces to the cutting member or tool and shifting to the discharge and loading station.

I claim:

1. The combination with a machine tool including a work support, a cutter support said work support being adapted for relative translation with respect to the cutter to shift the work and cutter into and out of operative relation one to the other, a rock arm associated with the work support, an abutment in fixed relation to the cutter for engagement with and oscillation of the arm on relative approach and retraction of the parts, means mounting the work support for rotary movement, an indexing mechanism operatively associated with the rock arm for intermittently indexing the work support on oscillation of the arm, a plurality of work clamps carried by the work support and a cam member oscillatable with and relative to the work support for successively actuating the several work clamps.

2. In a mechanism of the character described, the combination with a work holder, of work retaining means carried thereby including a positioning member, a work clamp supported thereby, a plurality of normally, laterally extending compressible work clamping fingers carried by the clamp and presenting inclined surfaces in the direction of application of a work piece whereby the work piece may be snapped down thereover and will be automatically retained thereby, and means for subsequently forcing the clamping fingers into locking engagement with the work pieces.

3. The combination with a machine tool including a work support, of work retaining means carried thereby including a clamp plunger having a projecting head, a plurality of clamp fingers pivoted to the head for limited oscillation relative thereto, means for resiliently, outwardly urging said members, said head having recesses permitting retraction of the members within the body thereof as the work piece is forced thereover and means for shifting the head in the direction of the work support for securing the fingers in engagement with the work piece.

4. The combination with a machine tool including a work support, of work retaining means carried thereby including a clamp plunger having a projecting head, a plurality of clamp fingers pivoted to the head for limited oscillation relative thereto, means for resiliently, outwardly urging said fingers, said head having recesses permitting retraction of the fingers within the body thereof as the work piece is forced thereover, means for shifting the head in the direction of the work support for securing the fingers in engagement with the work piece, said means including a wedge for effecting initial clamping movement of the parts and a supplemental toggle for accentuating the clamping action and locking the parts in position.

5. The combination with a machine tool including a work support, of work retaining means carried thereby including a clamp plunger having a projecting head, a plurality of clamp fingers pivoted to the head for limited oscillation relative thereto, means for resiliently, outwardly urging said fingers, said head having recesses permitting retraction of the fingers within the body thereof as the work piece is forced thereover, means for shifting the head in the direction of the work support for securing the fingers in engagement with the work piece, said means including a wedge for effecting initial clamping movement of the parts, a supplemental toggle for accentuating the clamping action and locking the parts in position and means for yieldingly urging the wedge and toggle into operative position.

6. The combination with a machine tool including a work support, of work retaining means carried thereby including a clamp plunger having a projecting head, a plurality of clamp fingers pivoted to the head for limited oscillation relative thereto, means for resiliently, outwardly urging said fingers, said head having recesses permitting retraction of the fingers within the body thereof as the work piece is forced thereover, means for shifting the head in the direction of the work support for securing the fingers in engagement with the work piece, said means including a wedge for effecting initial clamping movement of the parts, a supplemental toggle for accentuating the clamping action and locking the parts in position, means for yieldingly urging the wedge and toggle into operative position and cam mechanism for automatically controlling said yielding actuation.

7. Mechanism of the character described, the combination with a reciprocable work supporting table and a support therefor, of an actuator carried by the support, an indexable work carrier on the table, an oscillatable lever depending from the carrier for engagement with and actuation by the member on the support, on relative translation of the parts, a pawl carrier actuated by the lever, a ratchet on the rotatable work support for actuation by the pawl carrier, work clamping members on the work support, a control cam coupled with the pawl carrier for oscillation therewith and relative to the indexable work support and connections between the cam and work clamping mechanism for actuation thereof on oscillation of the cam with respect thereto.

8. A connecting rod slotter including a cutter and a work holder adapted for movement toward and from the cutter and work positioning and retaining means on the holder including a central positioning boss, a pair of work retaining members disposed to one side thereof for retaining flat portions of the work pieces and additional pair of members disposed at the opposite side for retention of a second portion of a work piece and means for simultaneously shifting members of each pair into and out of engagement with a work piece as positioned by the boss.

9. A milling machine including a cutter and a work holder, work positioning and retaining means on the holder including a clamp plunger adapted to receive and clamp work which is applied thereto in an axial direction, said clamp plunger having automatically acting latch means to prevent a return axial movement of the work therefrom, said work table being adapted for movement with respect to the cutter to sever a portion of the work therefrom, and means automatically effective upon retraction of the work from the cutter to release the clamping means to permit removal of the segments laterally of the plunger axis.

10. An indexing mechanism comprising a movable member, an indexing plate integral therewith, means to lock the plate in indexed position, an oscillatable member having means for imparting an indexing movement to the plate, and additional means carried by the oscillatable member and actuable upon initial movement of the member to effect indexing for releasing said locking means.

11. In a device of the class described a rotary work holder, means to index said holder including an index plate integral with the holder, a plurality of locking notches formed in the periphery of the plate, a spring pressed locking pawl engageable with the notches to hold the plate in a pre-determined position, oscillatable ratchet means effective upon movement in one direction to rotate said plate and means effective upon initiation of said rotary movement to retract the locking plunger.

12. An indexible work holder comprising an indexible member having a plate fixed therewith, a plurality of notches formed in the periphery of the plate, a locking pawl mounted in fixed relation to the member, resilient means constantly urging said pawl into engagement with the plate to lock the same in an indexed position, ratchet means for effecting said indexing movement and means operable upon actuation of said ratchet means to retract said locking plunger whereby the plate will be unlocked and indexed by a single uni-directional stroke of said ratchet means.

13. A machine of the character described including a rotary work supporting member, a plurality of work clamping members establishing work receiving stations for successive presentation in operative relation to a cutting member, an oscillatable control mechanism for imparting step by step unidirectional rotative movement to the work holder, said mechanism including a pawl for intermittent engagement with the work holder to effect its rotation, toggle mechanism for actuating the work clamps and a cam operatively connected to said toggle mechanism for controlling the operative position of the work clamping members.

WALTER D. ARCHEA.